United States Patent

Booker, Jr. et al.

[15] 3,647,954

[45] Mar. 7, 1972

[54] CONTINUOUS DISPLAY ON INTERMITTENT VIDEO SIGNALS

[72] Inventors: Clyde A. Booker, Jr., Pittsburgh; Francis T. Thompson, Murrysville, both of Pa.

[73] Assignee: Westinghouse Electric Corporation, Pittsburgh, Pa.

[22] Filed: Oct. 6, 1969

[21] Appl. No.: 863,974

[52] U.S. Cl. ....................................178/6.6 A, 178/69.5 TV

[51] Int. Cl. ..........................................................H04n 5/78

[58] Field of Search ....................178/6.6 A, 6.6 DD, 5.4 CR, 178/69.5 TV, 69.5 DC

[56] References Cited

UNITED STATES PATENTS 3,051,777 8/1962 Lemelson ...............................178/6.6

3,397,283 8/1968 Stosberg et al...................178/6.6 DD

*Primary Examiner*—Richard Murray

*Attorney*—F. H. Henson, C. F. Renz and A. S. Oddi

[57] ABSTRACT

A system for the continuous display of live video information, for example, from a television camera scanning an X-ray image, and stored video information, which may comprise selected of the live video signals which are recorded in a recording media, wherein the synchronizing signals utilized for controlling the generation of the live video information and recording the stored information is controlled in time so as to correlate properly the live and stored video information to permit the comparison and continuous display thereof.

6 Claims, 4 Drawing Figures

INVENTORS
Clyde A. Booker, Jr. &
Francis T. Thompson.
BY
ATTORNEY

CONTINUOUS DISPLAY ON INTERMITTENT VIDEO SIGNALS

BACKGROUND OF THE INVENTION

1. Field of the Invention

The present invention relates to systems for processing live and recorded video information and, more particularly, to such systems wherein comparison and continuous display of the video information is desired.

2. Description of the Prior Art

In copending application Ser. No. 754,546, filed Aug. 22, 1968, assigned to same assignee as the present application, an X-ray image recording system is shown wherein a television camera is utilized for scanning an X-ray image with selected of the images being recorded on a magnetic recording media such as a magnetic recording disc. Once the X-ray images are recorded, the X-ray equipment may be deenergized thereby minimizing the exposure of the patient to the X-rays with the recorded image then being repetitively played back and displayed for the examination of the user. The recorder image may be updated at predetermined time intervals by erasing the previously recorded information and energizing the X-ray equipment to record a new image which then may be played back and displayed. The patient is thus only subjected to the X-ray radiation during the time period that the recorded image is being updated. It would be highly desirable if the live television signals could be displayed during the time period that the recorded information is being erased and updated so that a continuous display could be provided.

In another mode of operation of the X-ray image recording apparatus such as taught in the cited copending application, an X-ray image is recorded and them compared with live video information from the television camera, for example, by subtraction so as to enhance a particular portion of the patient's body under surveillance. Thus, for example, an X-ray image may be recorded corresponding to a portion of the patient's body prior to the introduction of a dye into that portion of the body. After the introduction of dye the stored video is subtracted from the live video information to provide difference information which is displayed as a difference image. The difference image thus enhances the portion which has the dye introduced thereto with the background areas which have not changed being cancelled by the subtraction of the live and stored information. Again it would be highly desirable if a continuous display of the live and stored information would be permitted when updating the stored information and switching between the display of live, stored and difference images.

The continuous display of the television picture when switching between live and stored sources is not readily possible due to the inherent time delays introduced by the recording of the video information. Because of the relatively wide bandwidth of video information and the relatively narrow bandwidth available with magnetic recording media, such as tape, drums or discs, it becomes necessary that special recording techniques be utilized to provide high-quality pictures upon reproduction. Typically, the video signals to be recorded are utilized to frequency modulate a carrier frequency which is selected to be within the bandwidth of the recording media. The frequency-modulated signals are then recorded on the magnetic recorded media and for playback are demodulated to recover the original video intelligence that had been modulated on the carrier. The recorded information has a time delay with respect to the live information due to the modulation, recording and demodulation operation. In order to provide continuous display without loss of synchronism or rolling of the picture or to prevent the horizontal displacement of the live and stored video information, it becomes necessary to introduce time compensation between the live and stored information so that a continuous display comprised of both live and stored information and the difference combination thereof can be provided. The present invention is directed to the end of providing such a continuous display.

SUMMARY OF THE INVENTION

Broadly, the present invention provides a system for the continuous display from live and stored video information and synchronizing signals wherein time compensation is provided so that continuous display of either live, stored or a combination thereof is provided with synchronizing signals being utilized to control the generation of the live information and the recording of the stored information and display thereof.

DESCRIPTION OF THE PREFERRED EMBODIMENT

Figure 1:
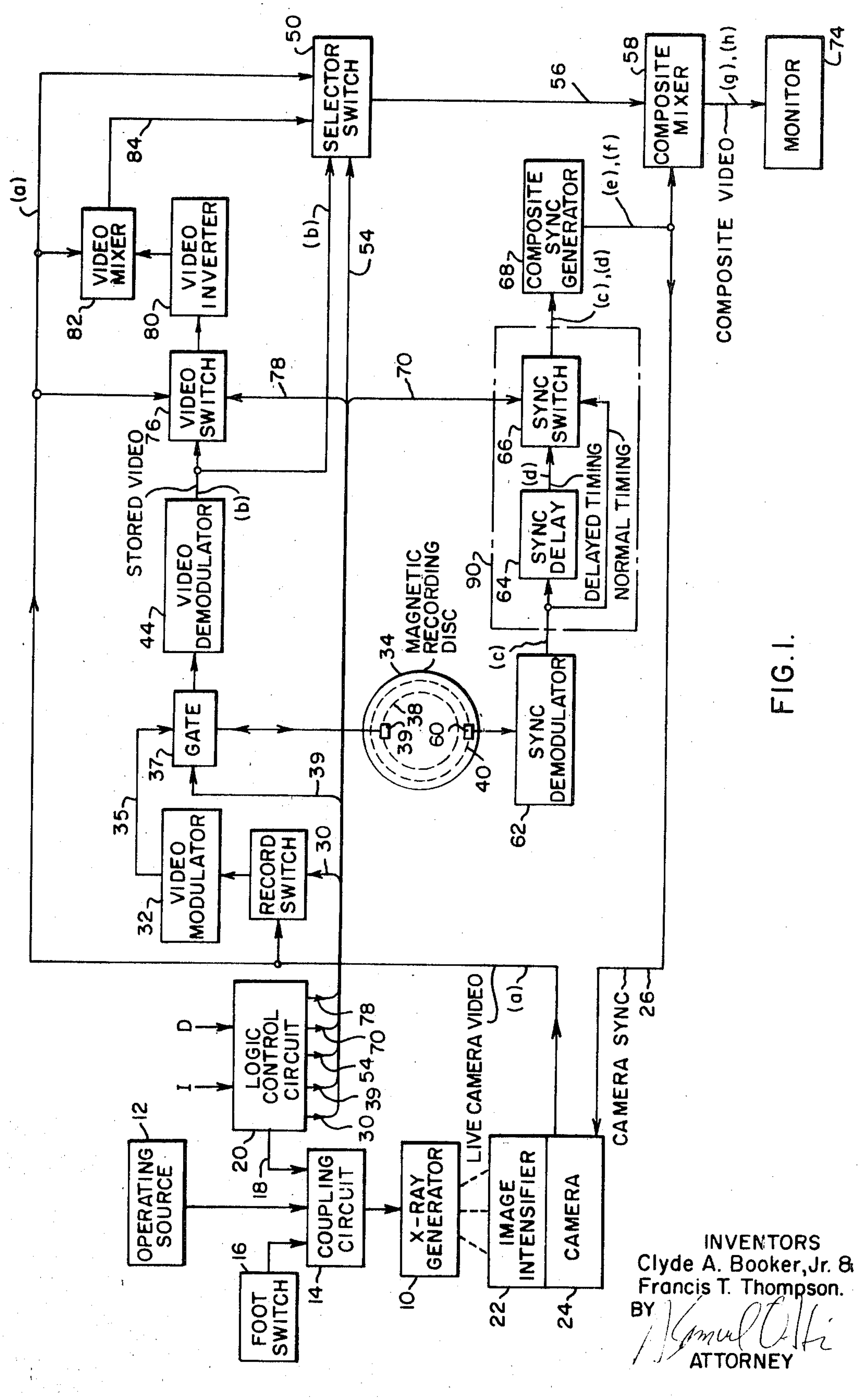
FIG. 1 is a block diagram of the system of the present invention.

Referring to FIG. 1 an X-ray generator 10 is provided which is capable of irradiating a patient or object with X-rays when energized to provide an X-ray image output. The X-ray generator 10 is energized from an operating source 12 via a coupling circuit 14. The operating source 12 may comprise an AC source suitable for supplying operating power to the X-ray generator 10. The coupling circuit 14 is operative to couple therethrough the output of the operating source 12 to the X-ray generator 10 and is turned on in response to an input from a foot switch 16 or from an input 18 from a logic control circuit 20. Thus, for example, the depression of the foot switch 16 by the operator of the system activates the coupling circuit 14 to energize the X-ray generator 10 from the operating source 12 to provide an X-ray image output of the patient or object under surveillance. The X-ray image output of the X-ray generator 10 is amplified in an image amplifier 22 to supply an amplified light image which is scanned by a television camera 24 under the control of camera synchronizing signals which are applied via an input 26 to the camera 24.

Figure 2:
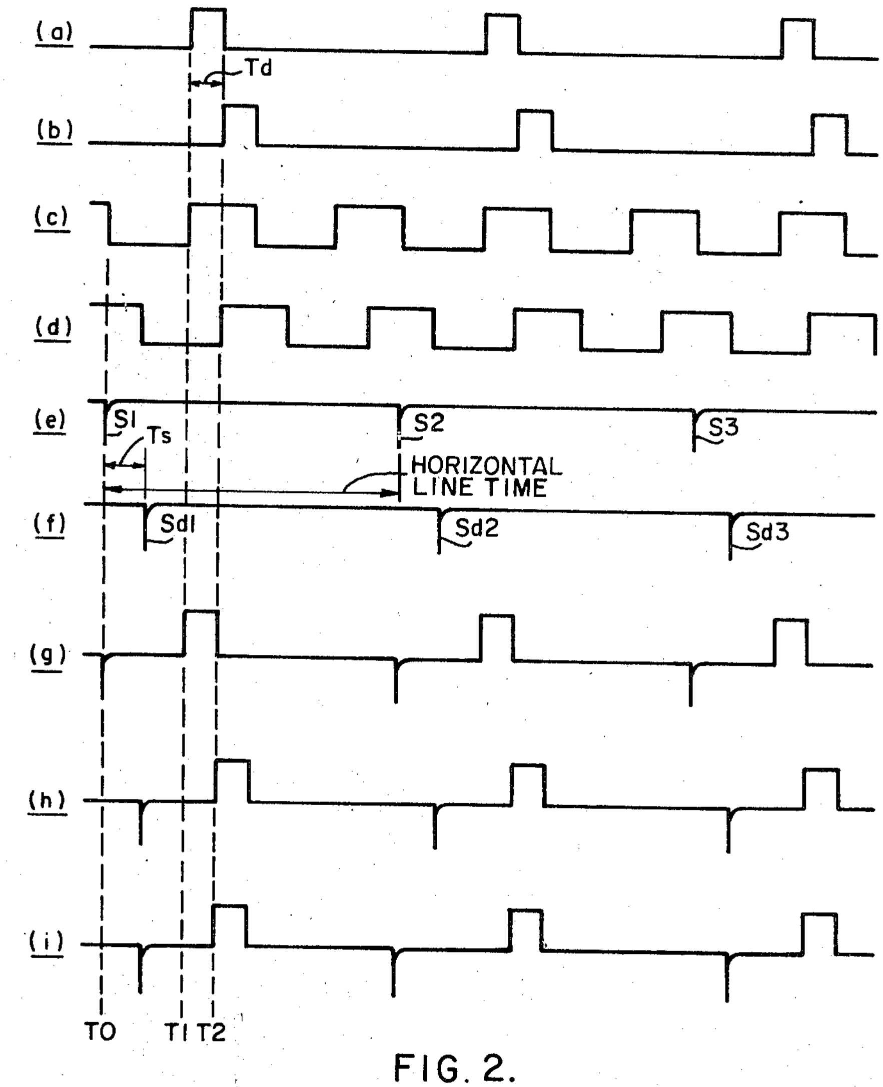
FIG. 2 is a waveform diagram including a series of curves used in explaining the operation of FIG. 1.

In response to the scanning of the amplified light image the camera 24 provides an output (a) consisting of live camera video signals such as for example as represented in curve (a) of Figure 2. In FIG. 1, the letter designations will correspond to the various curves of FIG. 2 indicating the waveform appearing at the indicated points in the block diagram of FIG. 1.

When it is desired to record a selected image a record switch 28 is closed in response to an output 30 from the logic control circuit 20 to supply the output (a) of the camera 24 to a video modulator 32. Assuming that the camera 24 is being scanned at the normal vertical field rate of 60 fields per second, that is, the time required for the camera to scan one complete field is one sixtieth of a second, in a typical example six fields of scan would be utilized to record a complete video frame corresponding to the selected X-ray image. Fields 1 and 2 are utilized to adjust the camera automatic gain control (AGC) for the particular image, fields 3 and 4 are utilized to erase any previously stored image and fields 5 and 6 are utilized of recording into the system to define a complete frame of video information corresponding to the image.

The output (a) from the switch 28 is applied to a video modulator 32 and is used to modulate a carrier frequency which is selected to be within the band pass of a magnetic recording disc 34. The output 35 of the video modulator 32 comprises frequency modulated (FM) signals modulated in accordance with the video input (a) thereto. The FM output 35 of the video modulator 32 is thereto applied to a gate 37 which is gated on by an input 39 applied from the logic control circuit 20 when it is desired to record the output 35. The output 35 passes through the gate 37 and is recorded via a recording playback head 39 on a recording track 38 of the magnetic recording disc 34, the disc 34 being rotated by a suitable motor, not shown. The disc 34 also has prerecorded on a track 40 thereof synchronizing information which is utilized in the present system for the synchronous control of the camera 24 and the recording operation as will be explained below. The synchronizing information may comprise, for example, a fixed clock frequency of 31.5 KHz. frequency modulated on a suitable carrier and recorded on the track 40. The recorded synchronizing information is utilized to establish a standard horizontal line rate of 15,750 Hz. and a standard vertical field rate of 60 Hz., for example, by a division of the 31.5 KHz. clock frequency by 2 and 525, respectively.

When it is desired to output the recorded video information on the track 38 of the disc 34 the gate 37 in response to an output 39 from the logic circuit 20 is placed in a condition to translate the output of the recording playback head 37 to an output 42 thereof. The output 42 is an FM output corresponding to the FM signals 35 previously recorded. The output 42 is applied to a video demodulator 44, which comprises a frequency demodulator which converts the recorded FM signals into video signals corresponding to the originally recorded video information. The output (b) of the video demodulator 44 is shown in curve (b) of FIG. 2.

Curve (c) of FIG. 2 shows normal timing signals as designated herein and comprises a train of clock pulses at a frequency of 31.5 KHz. for example. The horizontal line time is thus established by two periods of the waveform (c). A period begins at a time TO defining a normal reference time. In curve (a) of FIG. 2, it can be seen that the X-ray image being scanned changes from a black level, for example, to a white level at a time T1 with respect to the time TO. However, it should be noted in curve (b) that the stored disc video does not change from a black to a white level until a later time T2. The delay time between the times T1 and T2 is being defined at the time T*d* as shown in curves (a) and (b). The delay time between the live video and the stored video is due to time delay caused by the modulating, recording and demodulating operations occuring in the systems of FIG. 1 in that it requires a time of T*d* for the incoming live video to be frequency modulated, recorded on the disc 34 and then demodulated in the demodulator 44 to be outputed as the stored video waveform of curve (b). Due to the modulating, recording and demodulating time delay, the stored video is displaced horizontally by the time T*d* with respect to the live video which would cause a horizontal displacement of the stored video if this were to be displaced or compared with respect to the live video of curve (a). Thus in order to switch between live and stored video or to compare live and stored video, it is necessary that some time compensation be provided therebetween to compensate for the delay in time T*d*.

The operation of the present system will be discussed with respect to two modes of operation, namely an intermittent mode and a differencing mode. In the intermittent mode, the stored video information is changed every N seconds, that is, every N seconds the stored video information is updated. In the present system, the logic control circuit would be supplied with an intermittent mode input I which would cause the logic control circuit 20 to supply the proper outputs for effecting the desired intermittent operation. Every N seconds, the logic control circuit will supply an output 18 to the coupling circuit 14 to cause the X-ray generator 10 to be energized from the operating source 12. As previously described, the X-ray generator is then energized for six consecutive fields with the first and second fields being used to adjust the automatic gain control of the camera 24, the third and fourth fields being utilized for erasing the previously stored information on the disc 34 and the fifth and sixth fields being recorded on the track 38 of the disc 34. At the end of the sixth field, the output 18 would be removed to cause the X-ray generator 10 to be deenergized.

In FIG. 1, the live camera video output (a) is supplied to a selector switch 50. The stored disc video output (b) is also applied to the selector switch 50.

The live camera video output (a) and the stored disc video (b) which are supplied at inputs to the selector switch 50 are selectively outputed by the switch 50 under the control of a logic input 54 thereto from the logic control circuit 20. When the X-rays are off, a logic control input 54 is supplied to the selector switch 50 to translate the stored disc video output (b) through the selector switch 50 to its output 56. The input 54 maintains the (b) output at 56 during the first two fields after the X-ray generator 10 has been energized when the camera AGC is adjusted. However, at the end of the second field the previously stored information on the disc 34 is to be erased. Thus at the beginning of the third field of scan, the live camera output (a) is translated by the selector switch 50 under the control of logic control input 54 to the selector switch 50. The live camera video output (a) is continued during the third, fourth, fifth and sixth field of scan while the X-ray generator is energized. The logic control input 54 causes the selector switch 50 to block the stored video (b) which has just been stored on the disc 34. It can thus be seen that the selector switch 50 is operative to output the stored video (b) during all times except when the previously recorded information is being erased from the disc 34 during fields 3 and 4 and when new information is being recorded, thereon during fields 5 and 6.

As previously explained the live and stored video signals have a time delay T*d* due to the modulating, recording and demodulating time delay. This time delay is compensated for by delaying the supplying of synchronizing signals when the stored disc video output is supplied at the output 56 of the selector switch 50. The synchronizing signals are applied to the composite mixer 58 and may comprise either normal synchronizing signals such as shown in curve (e) of FIG. 2 or delayed synchronizing signals such as shown in curve (f) which are delayed a time period T*s* with respect to the normal synchronizing signals S1, S2, S3. Thus, as shown in curve (f) of FIG. 2, the delayed sync pulses S*d*1, S*d*2, are delayed, respectively, a time period T*s* from the normal sync pulses S1 and S2 of curve (e). The time delay T*s* is equal to the time delay T*d* which is introduced due to the modulating, recording and demodulating operation.

The normal or delayed synchronizing signals are provided in the following manner. A playback head 60 senses the synchronizing signals recorded on the track 40 of the magnetic recording discs 34 and supplies this an an input to a sync demodulator 62 which demodulates the recorded synchronizing information to provide the timing pulses as shown in curve (c) of FIG. 2 as normal timing signals. The normal timing output of the sync demodulator 62 is applied to a sync delay 64 and also to a sync switch 66. The function of the sync delay 64 is to delay the normal pulses by a time period T*s* so as to provide delayed timing signals according to the waveform of curve (d) of FIG. 2. The delayed signals (d) are also provided to the sync switch 66. Which of the inputs (c) or (d) the sync switch 66 translates therethrough to a composite sync generator 68 is determined by a logic control input 70 thereto supplied by the logic control circuit 20. It becomes apparent that when the live camera video (a) is outputed by the selector switch 50 that normal timing (c) should be translated by the sync switch 66 and when stored disc video (b) is outputed by the selector switch 50, the sync switch 66 should translate the delayed timing (d).

The output (c) or (d) of the sync switch 66 is supplied to a composite sync generator 68 for generating normal synchronizing pulses S1, S2, S3 (curve (e)) or delayed synchronizing pulses S*d*1, S*d*2, (curve (f)) in response to the (c) or (d) inputs supplied respectively thereto. In the composite sync generator 68, the 31.5 KHz. clock frequency outputs (c) or (d) are divided by 2, for example, to provide a standard horizontal rate of 15.75 KHz. The output of the composite sync generator 68 is supplied to the composite mixer 58 which then supplies an output which is the sum of the inputs 56 and 72 therein comprising the sum of the video output 56 from the selector switch 50 and the sync output (e) or (f) from the composite sync generator 68. When live camera video (a) is supplied at the output 56 and normal sync (e) is supplied at the output 72, the composite mixer 58 supplies an output (e) such as shown in curve (g) of FIG. 2 with the sync pulse occurring at the normal time TO and the white portion beginning at the time T1. When stored disc video is supplied at the output 56 and delayed sync is supplied at the output 72, the composite mixer 58 supplies an output (h) such as shown in curve (f) of FIG. 2. In this instance, the delayed sync pulse does not occur until a time delay T*s*, which is equal to the time delay T*d*, after the time TO. However, it should be noted that the white portion occurs at the same time with respect to the delayed sync pulse in curve (h) as does the white bar with respect to the normal sync pulse in curve (g).

The output (e), (f) of composite sync generator 68 is connected via the input 26 to supply the synchronizing signals for the camera 24. Thus, the camera 24 is controlled by the synchronizing signals that are translated by the switch 66 to the composite sync generator 68. Hence, in the intermittent mode of operation presently being described, normal sync pulses will be provided to the camera 24 via the input 26 when the camera is scanning the new X-ray image to be stored during the third, fourth, fifth and sixth fields subsequent to the energization of the X-ray generator 10 every N seconds.

The outputs (g) or (h) of the composite mixer 58 comprise composite video signals which are applied to a monitor 74. The monitor 74 may comprise a suitable cathode-ray tube monitor which is responsive to composite video signals such as shown in curves (g) and (h) of FIG. 2 and which is operative to display a standard television picture in response to the video information in the waveform and under the control of the synchronizing signals supplied thereto. It should be noted that a continuous display will be provided on the monitor 74 even though the inputs (g) or (h) thereto will be switched as previously described. There will be no horizontal displacement of the picture displayed on the monitor 74 when the input is switched from the input (g) to the stored input (h) because the delayed sync pulses are utilized with respect to the stored disc video and thereby disposes the delayed sync pulse at the same relative time position to the video information as would be the normal sync pulse to the live camera video. Thus, switching may occur between live and stored inputs to the monitor 74 without being disruptive of the horizontal or vertical scanning operation of the monitor and will provide a continuous display with the video having the same relative position horizontally regardless of whether live or stored video information is being supplied thereto.

In the differencing mode of operation, the stored disc video is subtracted from the live camera video so as to cancel out the common portions of the video signals and thereby enhance any differences therebetween. To accomplish this, the live video (a) is applied to a video switch 76 which has also applied thereto the stored video (b). A logic control input 78 is supplied to the video switch 76 from the logic control circuit 20 in order to control which of the inputs thereto, either the live or the stored video signals, will be translated through the video switch 76 to a video inverter 80. In the most usual mode of operation the stored video (b) will be translated through the video switch 76 to be inverted by the video inverter 80 as to polarity and then applied to a video mixer 82. The other input to the video mixer 82 is the live camera video (a). Thus, in the video mixer 82, the output from the video inverter 80 is subtracted from the live video (a) to provide a difference output 84 which is supplied to the selector switch 50. In the differencing mode of operation, the logic control input 54 to the selector switch 50 causes the switch to translate the difference input 84 therethrough to be outputed at 56 for application to the composite mixer 58.

Since the stored disc video is delayed by the time delay T*s* it is necessary that the live camera video be delayed by the same amount so that the subtraction operation in the video mixer 82 may take place in time coincidence. This is effected by supplying a logic control input 70 to the sync switch 66 which permits the translation thereto of the delayed timing signals (d) to the composite sync generator 68. Delayed sync signals (f) are thus supplied from the output of the composite sync generator 68 to the camera sync input 26 of the camera 24 causing the camera 24 to be synchronized according to the delayed sync timing as shown in curve (d). Accordingly, the live camera video (a) will be delayed by the time T*d* to be in time coincidence with the stored disc video (b). Thus, the stored disc video may be subtracted from the live camera video, in the video mixer 82 to supply a difference output 84 to the selector switch 50.

The delayed sync pulses (d) are also applied to the composite mixer 58 so that the output of composite mixer 58 will be the difference between the delayed live video and the stored video at the delayed sync time. This difference composite video is then applied to the monitor 74 for display thereon with the difference between the live and stored video being enhanced on the display. The degree to which cancellation occurs in the video mixer 82 may be controlled by controlling the respective amplitudes of the live and stored video signals. By so delaying the live camera video by utilizing the delayed sync pulses for the camera sync, the comparison of live and stored video information is made in time correspondence so that the spatial displacement of the difference signal will also be in correspondence to provide the desired difference picture on the monitor 74. Curve (g) of FIG. 2 shows a representation of a live camera video generated with the delayed sync pulses.

When it is desired to erase the previously stored video information and to record new video information on the disc 34 when operating in the differencing mode, the live camera video is compared with itself. During the third and fourth fields, when the previously stored information is being erased, and the fifth and sixth fields, when the new video information is being stored, the video switch 76 is provided with an input 78 thereto which permits the translation of the live camera video therethrough rather than the stored disc video. The video inverter 80 thus inverts the live camera video and compares it with the live camera video being applied directly to the video mixer 82 to provide a difference output 84. The selector switch 50 translates this difference under the control of the logic control 54 so as to provide an output 56 to the composite mixer 58.

Since live camera video is being utilized, it is necessary that normal sync be supplied to the camera 24. This is accomplished by providing a logic control input 70 to the sync switch 66 causing the sync switch 66 to translate the normal timing signals therethrough to the composite sync generator 68 which provides a normal sync output at 72 to the composite mixer 58 and also the camera sync input 26 of the camera 24 at the normal sync time as shown in curve (c) of FIG. 2. The output of the composite mixer 58 is at normal sync time with the live difference being displayed on the monitor 74 during the third, fourth, fifth and sixth fields when the new video information is being stored in the disc 34.

At the end of the sixth field the video switch 76 is switched back to translate the stored disc video (b) therethrough to the video inverter 80, and the sync switch 66 is set to translate the delayed timing signals therethrough so that operation continues as previously described for subtracting the stored disc video from the live camera video in the video mixer 82 and the subsequent display.

Figure 3:
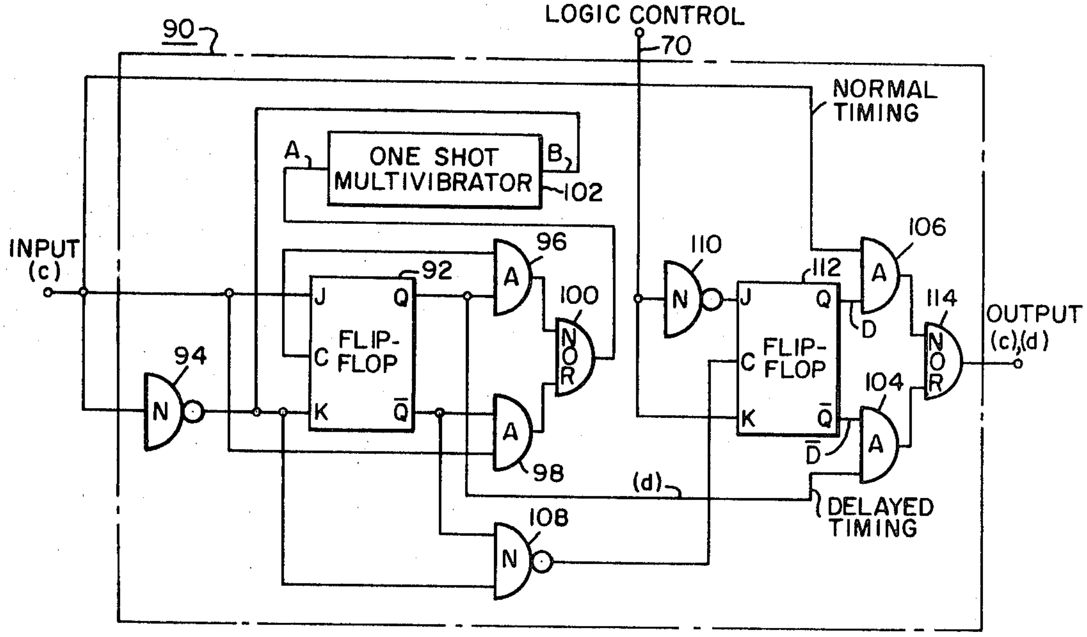
FIG. 3 is a block diagram showing in more detail a portion of FIG. 1.
Figure 4:
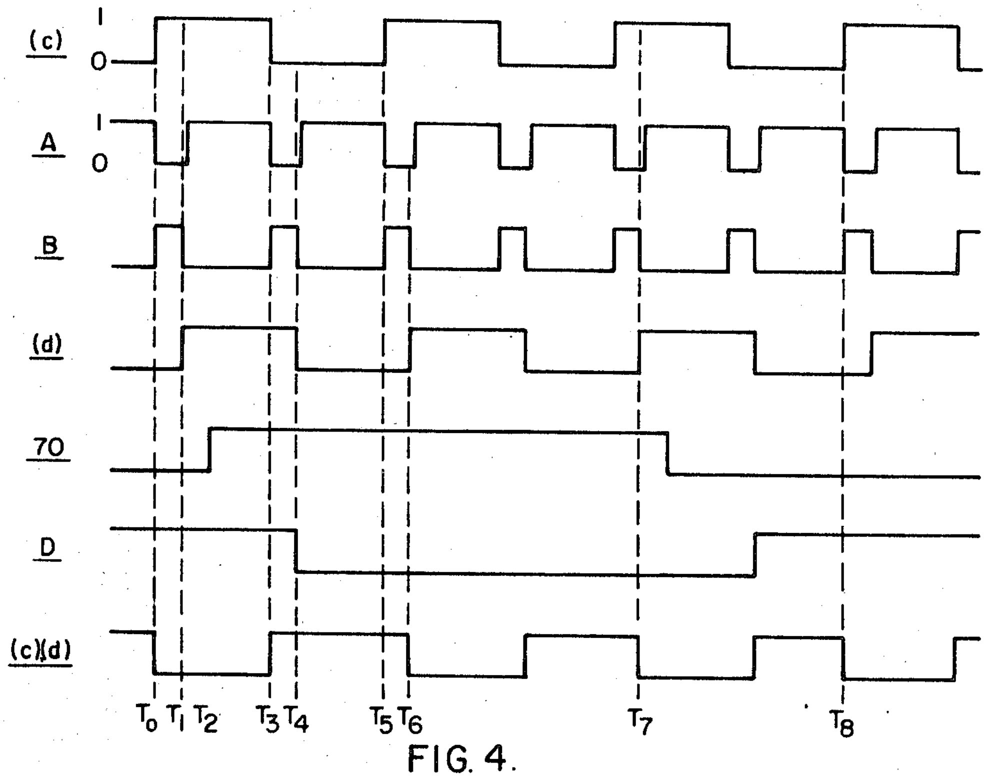
FIG. 4 is a waveform diagram including a series of curves used explaining the operation of FIG. 3.

FIG. 3 shows a more detailed block diagram of the sync delay 64 and the sync switch 66 which are enclosed within the dotted block 90 in FIG. 1. Similar reference characters will be utilized in FIG. 3 with respect to those used in FIGS. 1 and 2 and also the waveform diagram of FIG. 4. The normal timing pulses (c) as shown in curve (c) of FIGS. 2 and 4 are applied to the (J) input of a JK flip-flop 92. The (c) input is also applied to a NAND-gate 94 for inversion therein to apply the complement of the (c) input to the K input of the JK flip-flop 92. The JK flip-flop also has a clock input C and provides an output Q and the complement $\overline{Q}$ thereof. The truth table for a JK flip-flop is as follows:

| $t_n$ | | $t_{n+1}$ |
|---|---|---|
| J | K | Q |
| 0 | 0 | Qn |
| 0 | 1 | 0 |
| 1 | 0 | 1 |
| 1 | 1 | $\bar{Q}n$ |

In the above truth table, J and K designate respectively the binary inputs applied respectively to the J and K inputs of the flip-flop, $t_n$ designates the time immediately before a clock pulse C and the time $t_{n+1}$ designates the time immediately subsequent to a clock pulse C, changing from a ONE to a ZERO state. The JK flip-flops as used herein may comprise JK Master-Slave flip-flops designated type SN5472 by Texas Instruments, Inc.

The Q output of the JK flip-flop 92 is supplied to an AND-circuit 96 which also receives the K input. The complementary output $\bar{Q}$ is applied to an AND 98 which also receives the J input to the JK flip-flop 92. The outputs of the AND's 96 and 98 are supplied as inputs to the NOR 100 which supplies an output A to a one-shot multivibrator 102. The one-shot multivibrator is responsive to the A input thereto changing from a ONE level to a ZERO level at which time the one-shot multivibrator 102 supplies a ONE output for a predetermined time and then reverts to its ZERO output level. The input A to the one-shot multivibrator 102 is shown in curve A at FIG. 4 and the output B thereof is shown in curve B of FIG. 4. The output B is applied to the clock input C of the JK flip-flop 92.

At a time prior to the time $T_0$ as defined in FIG. 4, the input (c) is at a ZERO level, therefore, the J input to the JK flip-flop 92 is a ZERO and the K input will therefore be a ONE. According to the truth table, the Q output will be a ZERO and the complementary output $\bar{Q}$ will be a ONE. Since the AND 98 receives a ZERO from the J input and the AND 96 receives a ZERO from the Q output, both the AND's 96 and 98 will supply ZERO inputs to the NOR 100 which will therefore output a ONE to the one-shot multivibrator 102.

At the time $T_0$, the input (c) goes to a ONE level thereby causing the J input to be a ONE and the K input to be a ZERO. Since the output Q of the JK flip-flop 92 will not change until a clock input C is provided thereto, the Q output remains at ZERO and the $\bar{Q}$ output remains at ONE. Therefore, ONE inputs are provided to the AND 98 causing it to output a ONE to the NOR 100 these output changes from a ONE to a ZERO at the time $T_0$ as shown in curve A of FIG. 4. The change of the A output from a ONE to a ZERO triggers the one-shot multivibrator 102 so that it starts its timing period at the time $T_0$ and will continue to supply a ONE output until a time $T_1$ when its timing period is over and it will reset itself to a ZERO level as shown in curve B.

The ONE output from B of the one-shot multivibrator 102 is supplied to the clock input C of the JK flip-flop 92 thereby permitting the output of the flip-flop 92 to change according to the truth table for a ONE J input and a ZERO K input to have a Q output of ONE and a $\bar{Q}$ output of ZERO. The change in output for the flip-flop 92 cause both AND-circuits 96 and 98 to have ZERO outputs which causes the NOR 100 to provide a ONE output A as shown in curve A of FIG. 4.

The delayed timing pulses are provided at the output of the JK flip-flop 92 and are shown in curve (d) of FIG. 4 and applied to an AND 104. The delayed timing pulse (d) appears after a time delay $T_1 - T_0$ since the clock input C of flip-flop 92 is responsive to the output B of the one-shot multivibrator 102 changing from a ONE to a ZERO state at the time $T_1$. It is at the time $T_1$ that the output (d) which is the Q output of the flip-flop 92 changes from a zero to a ONE state. The timing period of the one-shot multivibrator 102 thus determines the amount of delay that occurs between the normal timing pulse (c) and the delay timing pulse (d). By setting the timing period of the one-shot multivibrator 102 to be the time period *Td*, as shown in FIG. 2, the proper time delay is introduced into the synchronizing pulses to provide the desired operation as discussed above.

The normal timing pulses (c) are applied to an AND 106. In order to control the time at which either the normal timing signal (c) or the delayed timing signals (d) are provided a logical arrangement including a NAND 108, a NAND 110, a JK flip-flop 112, an output NOR 114 and the AND's 104 and 106. The logic control 70, as shown in curve 70 of FIG. 4, is applied to the NAND 110 and the K input of the JK flip-flop 112; thus the J and K inputs are complements of one another. At a time prior to the time $T_0$, the input 70 is at a ZERO level so that the J input is at a ONE and the K input is at ZERO. Thus, the Q output of the flip-flop 112 is at a ONE level and the complement $\bar{Q}$ is at a ZERO level. The Q output of the flip-flop 112 is shown in curve D of FIG. 4. The D output is applied as an input to AND 106 and therefore controls whether the normal timing signals will change the output state of the AND 106 for controlling the output of the NAND 114. Conversely, the $\bar{D}$ output of the flip-flop 112 controls whether AND 104 is responsive to the delayed signals (d) for controlling the output of NAND 114. At a time prior to the time $T_0$, the normals timing signals are a ZERO; therefore, the AND 106 outputs a ZERO to the NAND 114. Since the $\bar{Q}$ ($\bar{D}$) output of the flip-flop 112 supplies a ZERO to the AND 104, the other input to the NOR 114 is also a ZERO so that the output of the NOR 114 is a ONE at a time prior to the time $T_0$. This is shown in curve (c) (d) of FIG. 4. At the time $T_0$, the normal timing pulse (c) changes to a ONE thereby two ONE inputs are supplied to the AND 106 thereby supplying a ONE input to the NOR 114 causing the NOR 114 to output (a) ZERO at the time $T_0$, see curve (c) (d) of FIG. 4.

The change of the output of the NOR 114 from a ONE to a ZERO level may be utilized to define the timing of the normal synchronizing pulses as shown in curve (e) of FIG. 2 with the composite sync generator 68 being responsive to the change of the curve (c) (d) from a ONE to a ZERO level to output the respective sync pulses S1, S2 and S3 as indicated in curve (e) of FIG. 2.

At a time prior to the time $T_0$, and NAND 108 received a ONE input from the K input of the flip-flop 92 and a ONE input from the $\bar{Q}$ output thereof so to provide a ZERO input to the clock input C of the flip-flop 112. At the time $T_0$ the K input of the flip-flop 92 changes to a ZERO thereby causing the NAND 108 to provide a ONE clock input to the flip-flop 112. At the time $T_1$ when the flip-flop 92 changes output states so that $\bar{Q}$ goes to a ZERO level, the NAND 108 thus received two ZERO inputs so as to output a ONE input to the clock input C.

At a time $T_2$ the logic control input 70 to the flip-flop 112 is changed from a ZERO to a ONE level; thus the J input is a ZERO and the K input is a ONE. However, the output states of Q and $\bar{Q}$ remain the same as the time $T_2$. At the time $T_3$, the normal timing input (c) changes from a ONE level to a ZERO level which instigates the timing of the one-shot multivibrator 102. Also at the time $T_3$, the AND 106 changes from a ONE to a ZERO output in response to the ZERO input thereto from the normal input (c). Hence, NOR 114 will change output states to a ONE as shown in curve (c) (s).

At the end of the timing period for the multivibrator 102, the output states of the flip-flop 92 are changed so that the NAND 108 changes output states causing the clock input to flip-flop 112 to go from a ONE level to a ZERO level thereby permitting the JK flip-flop 112 to change output states at the time $T_4$, as can be seen in curve D of FIG. 4. The D output goes from a ONE to a ZERO and thus $\bar{D}$ will be a ONE.

At the time $T_5$ the normal input (c) changes from a ZERO to a ONE thereby causing a ZERO input to be applied to the one-shot multivibrator 102 which begins its timing cycle at the $T_5$ and supplies a ONE output until the time $T_6$ when it reverts to its zero state. At the time $T_6$ the flip-flop 92 changes its Q output state from a ZERO to a ONE as shown in curve (d) of FIG. 4. Since the logic control input 70 to the JK flip-flop 112 has remained the same at a ONE level, and AND will input a ONE to the NOR 114 causing the output thereof to go from a ONE to a ZERO state as shown in curve (c) (d).

A previously explained, the composite sync generator 68 is responsive to the change from a ONE to a ZERO and outputs a delayed sync pulse such as shown in curve from of FIG. 2 which is delayed a time period $T_6 - T_5$ from the normal timing interval. Thus, with be a ONE logic control 70 D maintained at the ONE level delayed timing pulses will be outputed from the NOR 114.

When the logic control input 70 is changed to a ZERO input state the JK flip-flop 112 will change output states after the first occurrence of a clock pulse input from the NAND 108 changing from a ONE to a ZERO which will cause the D output of the flip-flop 112 to be one and the $\bar{D}$ output to be at a ZERO. Thus, for example, at a time T8 when the normal input (c) changes from a Zero to a ONE level, the AND 106 will translate a ONE to the NOR 114 thereby causing the NOR 114 to output a ZERO which will cause the generation of a synchronizing pulse at the normal timing rather than at the delayed time which would occur after the one-shot multivibrator 102 has timed out. The normal timing will continue until the logic control input 70 having a ONE level is applied thereto and the JK flip-flop 112 is reset so that the NAND 104 receives a ONE input from the $\bar{D}$ output of the JK flip-flop and the delayed timing pulses are applied at the other input thereof to control the change of states of the NOR 114 so that delayed timing pulses are outputed therefrom.

We claim:

1. In a system for providing a continuous display in response to live video signals, stored video signals and synchronizing signals, the combination of:

means for processing and recording selected of said live video signals to provide said stored video signals having a time delay with respect to said live video signals;

first translating means for receiving said live video signals and said stored video signals and being selectively operative to translate either said live or stored video signals or a combination thereof;

delay means for delaying said synchronizing signals a predetermined time to provide delayed synchronizing signals;

second translating means for receiving said synchronizing signals and said delayed synchronizing signals and being selectively operative to translate either said synchronizing signals or said delayed synchronizing signals;

means for combining the video signals translated by said first translating means and the synchronizing signals translated by said second translating means to provide composite video signals for display; and means for supplying the synchronizing signals translated by said second translating means to control the generation of said live video signals.

2. The combination of claim 1 wherein:

said time delay and said predetermined time are substantially equal.

3. The combination of claim 1 wherein:

said synchronizing signals are prerecorded in said means for processing and recording.

4. The combination of claim 3 wherein:

said means for processing and recording comprises modulating means for modulating said selected of said live video signals;

recording means for recording the modulated signals from said modulating means;

demodulating means for demodulating the recorded signals from said recording means to provide said stored video signals.

5. The combination of claim 3 wherein:

said live video signals are provided by a television camera; and said recording means comprises a magnetic recording media.

6. The combination of claim 1 includes:

inverter means for inverting the output of said first translating means;

comparing means for comparing said live video signals with the inverted output from said inverter means to provide a compared output; and third translating means for selectively translating said compared output to said means for combining.

* * * * *